Nov. 13, 1934.      J. W. WHITE      1,980,512
VEHICLE BRAKE
Filed April 27, 1931      2 Sheets-Sheet 1
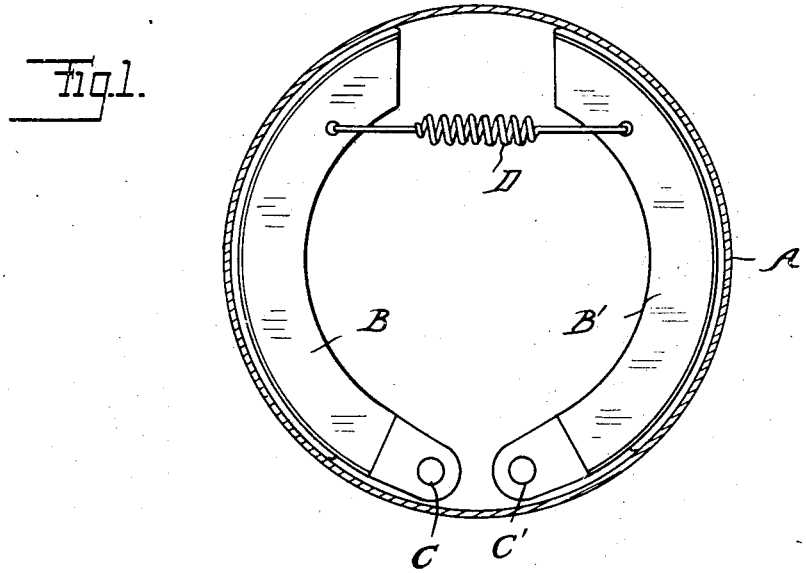
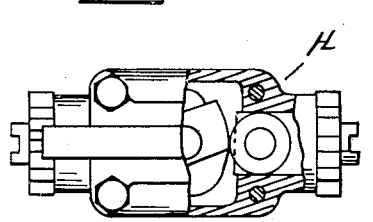
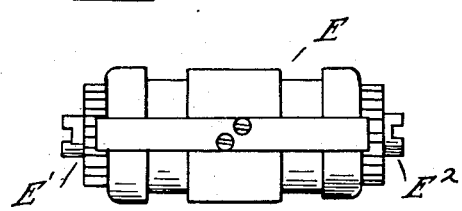
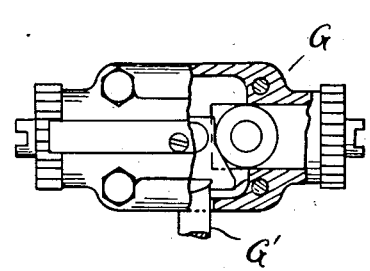
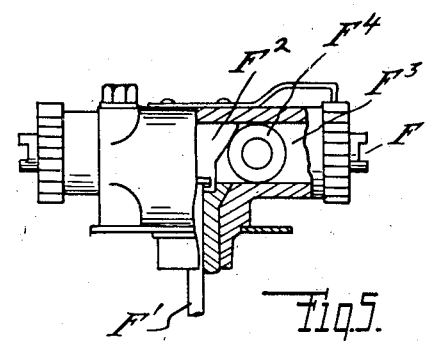
INVENTOR
John W. White
BY Whittemore Hulbert
Whittemore & Belknap
ATTORNEYS

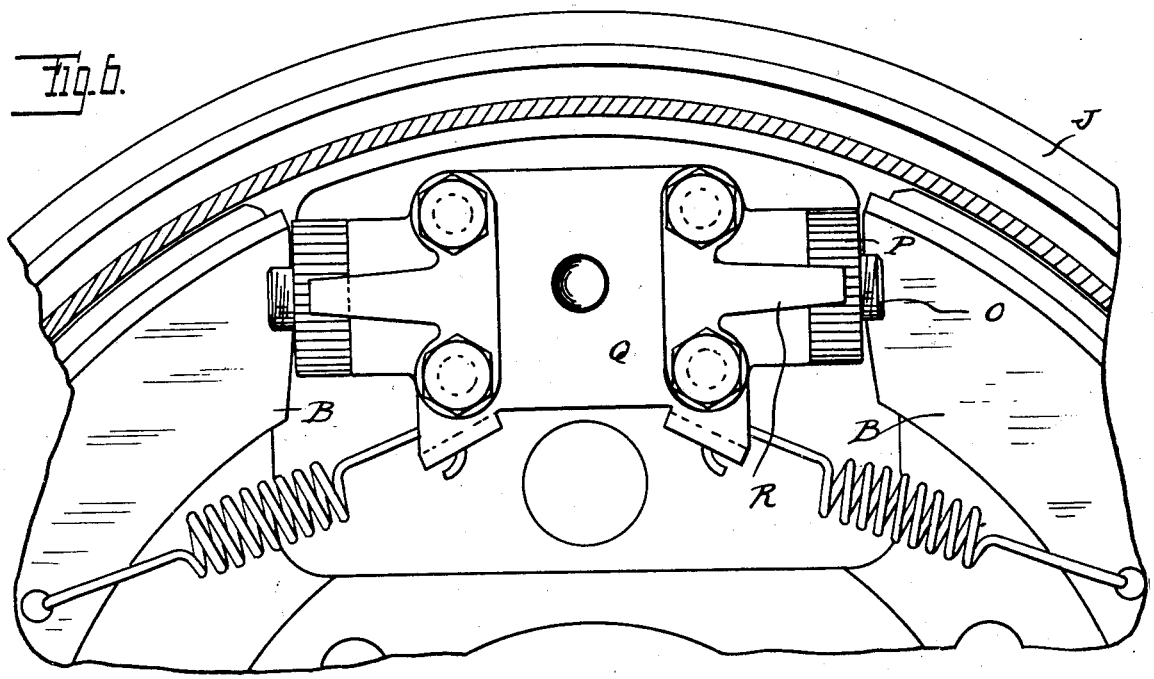
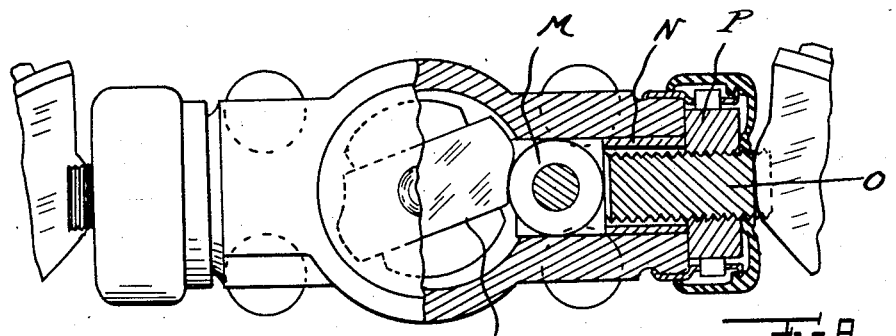
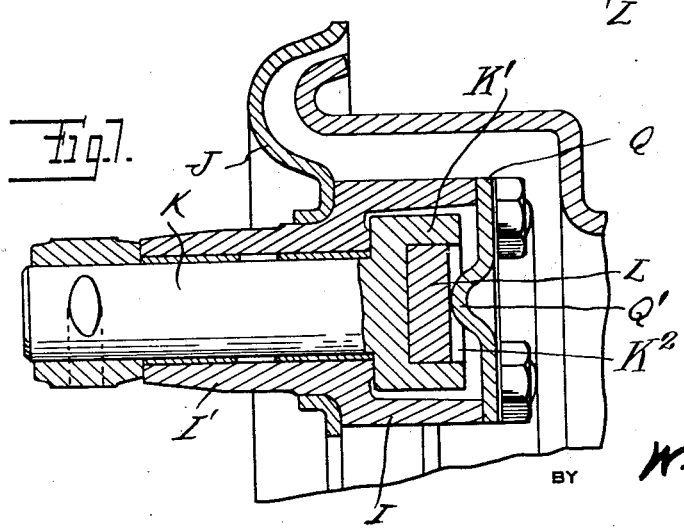

Patented Nov. 13, 1934

1,980,512

UNITED STATES PATENT OFFICE 1,980,512

VEHICLE BRAKE

John William White, Detroit, Mich.

Application April 27, 1931, Serial No. 533,297

7 Claims. (Cl. 188—78)

The invention relates to brakes designed for use on road vehicles and it is the primary object of the invention to obtain a standardized construction of brake unit per se which is adapted for use with various constructions of brake actuating mechanism. In the present state of the art there are two types of operating mechanisms which are most generally used upon road vehicles, viz: first, mechanical; second, hydraulic. The brake units used in connection with these different operating mechanisms vary in construction so that changing from one to the other generally requires complete re-design. Furthermore, in the general type of mechanical operating mechanisms there are different species, such as cam actuated, cable actuated, etc., each of which requires a special design of brake unit to be used therewith.

To simplify the problem of manufacture, I have devised a construction of brake unit which is adapted for alternative use with any one of the operating mechanisms above referred to. I have further devised a unique construction of mechanical actuator which is interchangeable with hydraulic units without requiring any modification in the latter. The invention therefore consists in various features of construction as hereinafter set forth.

In the drawings:

Figure 1 is a diagrammatic sectional elevation of my improved standardized brake unit;

Figures 2, 3, 4 and 5 are diagrammatic representations of different types of actuators adapted for mounting in the unit shown in Figure 1;

Figure 6 is a full size elevation showing a portion of the brake unit with my improved construction of mechanical actuator applied thereto;

Figure 7 is a cross section therethrough;

Figure 8 is a longitudinal section through the actuator.

As shown in Figure 1, the brake unit per se comprises a brake drum A and a pair of internal brake shoes B and B' mounted therein on opposite sides of the drum and anchored by pivots at one end thereof such as C and C'. The opposite ends of the shoes are spaced from each other a sufficient distance to receive any one of the actuators such as illustrated in Figures 2, 3, 4 and 5. Each of the shoes B and B' is moved in one direction only by the actuator, this pressing the shoe into frictional engagement with the drum. The return movement or retraction of this shoe is by a spring such as D which also holds the shoes in normal position.

The actuator E diagrammatically represented in Figure 3 is an hydraulic motor and need not be explained in detail other than to state that the ends of the pistons E', E² abut against the ends of the brake shoes when the unit is mounted therebetween. The unit F diagrammatically shown in Figure 5 is adapted for cable operation, the cable F' being attached to a wedge F² which is intermediate plungers F³ having anti-friction rolls F⁴ for engaging the wedge. The ends of the plungers F³ are also adapted to abut against the ends of the shoes B and B' when the unit is mounted therebetween. The unit G illustrated in Figure 4 is similar in construction to the unit F but is actuated by a rod G' instead of the cable F'. The unit H represented in Figure 2 is my improved mechanical actuator which will now be described in detail.

I is a casing within which the several elements of the mechanism are housed and which is adapted for mounting on the stationary brake head J in a position intermediate the brake shoes B and B'. The casing I has a bearing portion I' which extends through an aperture in the head J and has journalled therein the rock shaft K. At the inner end of this rock shaft is a cam L which is adapted to actuate rollers M mounted at the inner end of plungers N which are slidably mounted in the casing I. The outer ends of the plungers N may either directly engage the brake shoes B and B' or preferably as shown are provided with an adjustment through which compensation may be made for wear in the brake lining. This adjustment means comprises a screw threaded stud O, the inner end of which engages a recess in the end of the plunger N while the outer end is engaged by a nut P. This nut bears against the outer end of the plunger N and therefore by adjusting the nut the stud O may be moved outward or inward in relation to the plunger to vary the distance between the same and the shoe.

With the construction as described the chamber within the casing I in which the mechanism is located is preferably packed with lubricant and is then closed by a cover Q. The periphery of the nut P is preferably serrated to facilitate adjustment of the same and a spring dog R secured to the casing I bears against this serrated face to hold the nut from accidental movement. Instead of this manual adjustment means the mechanical operator may be provided with automatic adjustment means, but such construction forms no part of the present invention and will therefore not be described. To hold the studs O from turning when the nut P is adjusted, the ends of said studs are preferably slotted to form furcations engaging opposite sides of the web of the shoe against which the stud bears. In operation, the rocking of the shaft K will cause the cam L bearing on the rollers M to force the plunger N outward and through the medium of the nut P and stud O will transmit this movement to the shoes, which are thus pressed into braking contact with the drum. Upon reverse rotation of the rock shaft K the cam will release its pressure whereupon the spring D will return the shoes, carrying with them the studs O and plungers N.

To equalize the pressure upon the two plungers N the cam L is preferably transversely slidable in the rock shaft K and as shown the end of said rock shaft has an enlarged head K' with a transverse groove K² therein in which the cam L is slidable. The cover Q is provided with an inwardly projecting bearing portion Q' for engaging the cam L and holding the same in the slotted head K' but permitting transverse sliding movement to equalize pressure against the rolls M.

What I claim as my invention is:

1. The combination with a brake drum, of a stationary head therefor, a pair of shoes within said drum on opposite sides thereof, each shoe being pivotally connected at one end to said head, the free ends of said shoes being spaced apart a predetermined distance, a mechanical operating unit for said shoes comprising a casing mounted on said head within said drum intermediate the free ends of said shoes and having cylindrical end portions and an enlarged central portion, plungers slidable in the cylindrical end portions of said casing and having recessed ends, a rotary cam within the enlarged portion of said casing for engaging said plungers, screw threaded studs engaging the recesses in the ends of said plungers and at their outer ends bearing against said shoes, and nuts on said studs bearing against said plungers and rotatively adjustable to increase the projection of the studs to compensate for wear in the brake shoes.

2. The combination with a brake drum, of a stationary head therefor, a pair of shoes within said drum on opposite sides thereof, each shoe being pivotally connected at one end to said head, the free ends of said shoes being spaced apart a predetermined distance, a mechanical operating unit for said shoes comprising a casing mounted on said head within said drum intermediate the free ends of said shoes and having cylindrical end portions and an enlarged central portion, plungers slidable in the cylindrical end portions of said casing and having recessed ends, a rotary cam within the enlarged portion of said casing for engaging said plungers, screw threaded studs engaging the recesses in the ends of the said plungers and at their outer ends bearing against said shoes, and nuts on said studs bearing against said plungers and rotatively adjustable to increase the projection of the studs to compensate for wear in the brake shoes, said nuts being peripherally serrated, and resilient dogs secured to said casing and engaging the serrated periphery of said nuts to normally hold the same from rotative adjustment.

3. The combination with a brake drum and a stationary brake head therefor, of a brake shoe mounted on said head within said drum and a mechanical operating unit for said shoe comprising a casing mounted on said head within said drum, having a cylindrical end portion and an enlarged portion adjacent thereto, a plunger slidable in the cylindrical end portion operatively engaging said shoe, a rotary cam within the enlarged portion for engaging said plunger, a journal bearing integral with said casing extending through said stationary head, a rock shaft mounted in said bearing and having its inner end connected to actuate said cam and means intermediate said plunger and shoe adjustable to increase the length thereof and to compensate for wear.

4. The combination with a brake drum and a stationary brake head therefor, of a brake shoe mounted on said head within said drum and a mechanical operating unit for said shoe comprising a casing mounted on said head within said drum, having a cylindrical end portion and an enlarged portion adjacent thereto, a plunger slidable in the cylindrical end portion operatively engaging said shoe, a rotary cam within the enlarged portion for engaging said plunger, a journal bearing integral with said casing extending through said stationary head, a rock shaft mounted in said bearing and having its inner end connected to actuate said cam, a screw threaded stud engaging a recess in the end of said plunger and at its outer end bearing on said shoe, and a nut on said stud bearing against said plunger and rotatively adjustable to increase the projection of the stud to compensate for wear in the brake shoe.

5. The combination with a brake drum and a stationary head therefor, of a shoe within said drum, a mechanical operating unit for said shoe comprising a casing mounted on said head within the drum having a cylindrical end portion and an enlarged adjacent portion, a plunger slidable in the cylindrical end portion and having a recessed end, a rotary cam within the enlarged portion of said casing for engaging said plunger, a screw threaded stud engaging the recess in the end of said plunger and at its outer end bearing against said shoe, a nut on said stud bearing against said plunger and rotatively adjustable to increase the projection of the stud to compensate for wear in the brake shoe, said nut being peripherally serrated and a resilient dog secured to said casing and engaging the serrated periphery of said nut to normally hold the same from rotative adjustment.

6. The combination with a brake drum and a stationary brake head therefor, of braking means mounted within said drum and a mechanical operating unit for said braking means comprising a casing mounted upon said head within said drum having a cylindrical end portion and an enlarged portion adjacent thereto, a plunger slidable in the cylindrical end portion operatively engaging said braking means, a rotary cam within the enlarged portion for engaging said plunger, a journal bearing integral with said casing extending through said stationary head, a rock shaft mounted on said bearing and having its inner end connected to actuate said cam, and means intermediate said plunger and braking means adjustable to increase the length thereof and to compensate for wear.

7. In a brake mechanism, a mechanical actuator for the braking means comprising a casing having cylindrical end portions, a central portion with an open recess therein and a journal bearing portion concentric with said recess, plungers slidable in the cylindrical end portions of said casing and adapted to actuate the braking means, a rock shaft journaled in said bearing and having a shouldered head engaging said central recess, said head being transversely grooved, a member slidable in said transverse groove provided with cams at its opposite ends for engaging said plungers, a cover for closing said recess and a bearing on said cover for engaging said member in the transverse groove and for holding the same from displacement.

JOHN WILLIAM WHITE.